United States Patent [19]
Bloomfield

[11] Patent Number: 5,976,724
[45] Date of Patent: Nov. 2, 1999

[54] FUEL CELL POWER PLANT WITH ELECTROCHEMICAL AUTOTHERMAL REFORMER

[75] Inventor: David P. Bloomfield, Boston, Mass.

[73] Assignee: Niagara Mohawk Power Corporation, Syracuse, N.Y.

[21] Appl. No.: 08/893,143

[22] Filed: Jul. 15, 1997

[51] Int. Cl.⁶ .................................................. H01M 8/06
[52] U.S. Cl. ........................ 429/21; 429/24; 204/DIG. 4
[58] Field of Search ............................. 204/DIG. 4, 265; 205/637; 429/21, 24

[56] References Cited

U.S. PATENT DOCUMENTS

| | | |
|---|---|---|
| 3,148,089 | 9/1964 | Oswin . |
| 3,296,449 | 1/1967 | Heinz-Günther Plust et al. . |
| 3,342,717 | 9/1967 | Leduc ...................................... 204/265 |
| 3,407,094 | 10/1968 | Juda . |
| 3,449,168 | 6/1969 | Sederquist . |
| 3,450,567 | 6/1969 | Sederquist et al. . |
| 3,544,374 | 12/1970 | D'Alessandro et al. . |
| 3,544,376 | 12/1970 | Connor, Jr. et al. . |
| 3,976,507 | 8/1976 | Bloomfield . |
| 4,522,894 | 6/1985 | Hwang et al. ............................. 429/17 |
| 4,532,192 | 7/1985 | Baker et al. .............................. 429/19 |
| 4,533,607 | 8/1985 | Sederquist ................................. 429/13 |
| 4,620,914 | 11/1986 | Abens et al. ............................ 204/265 |
| 4,678,723 | 7/1987 | Wertheim ................................. 429/17 |
| 4,810,485 | 3/1989 | Marianowski et al. .............. 423/648.1 |
| 4,865,926 | 9/1989 | Levy et al. ................................. 429/20 |
| 5,149,600 | 9/1992 | Yamase et al. ........................... 429/17 |
| 5,290,641 | 3/1994 | Harashima ................................ 429/17 |
| 5,302,470 | 4/1994 | Okada et al. ............................. 429/17 |
| 5,308,456 | 5/1994 | Kunz et al. ............................. 204/130 |
| 5,340,663 | 8/1994 | Buswell et al. .......................... 429/17 |
| 5,397,656 | 3/1995 | Morimoto et al. ........................ 429/17 |
| 5,409,784 | 4/1995 | Bromberg et al. .................... 429/21 X |

OTHER PUBLICATIONS

Coughlin et al. "Novel Process Makes Hydrogen", Science Technology Concentrates, p. 23, Jun. 1979.

*Primary Examiner*—Stephen Kalafut
*Attorney, Agent, or Firm*—Wall Marjama Bilinski & Burr

[57] ABSTRACT

A fuel cell power plant includes an electrochemical autothermal reformed (EATR) which provides hydrogen to the fuel cell. The EATR includes an autothermal reformer region, an anode supply region, and a mixed ion conductor or membrane layer separating the autothermal reforming region from the reformer anode supply region. An anode gas loop, located between an anode supply region of the EATR and an anode compartment or section of the fuel cell circulates a mixture of hydrogen and a carrier gas between the two regions. The carrier gas ensures proper control of partial pressure of hydrogen in the two regions. A difference in operating temperature between the EATR and the fuel cell is exploited by heat exchanger which efficiently enable certain heating and cooling functions within the power plant.

10 Claims, 2 Drawing Sheets

FUEL CELL POWER PLANT WITH ELECTROCHEMICAL AUTOTHERMAL REFORMER

BACKGROUND OF THE INVENTION

This invention relates to a power plant using a reformer to supply hydrogen to a fuel cell, and in particular, to a power plant using an electrochemical autothermal reformer (EATR) to provide hydrogen fuel to the fuel cell.

A fuel cell is an electrochemical cell that converts the chemical energy of a fuel directly into electric energy in a continuous process. The overall fuel cell reaction typically involves the combination of hydrogen with oxygen to form water. For example, at 25° C. and 1 atm pressure, the reaction $H_2 + \frac{1}{2}(O_2) \rightarrow H_2O$ takes place with a free energy change ($\Delta G$) of $-56.69$ kcal/mole. In a galvanic cell, this reaction produces a theoretical cell voltage of 1.23 volts. Actual values are typically within the range of 0.9 to 1.1 volts. The main types of fuel cells used today include proton exchange membrane fuel cells, phosphoric acid fuel cells, alkaline fuel cells, solid oxide fuel cells, and molten carbonate fuel cells. Details on these individual technologies is found in "Fuel Cells, A Handbook (Revision 3)" published January, 1994 by the U.S. Department of Energy Office of Fossil Energy, incorporated herein by reference.

Fuel cells are limited by their need for pure hydrogen fuel. Most types of fuel cells are sensitive to even small amounts of impurities. A "reformer" is a known device in which a hydrocarbon fuel is mixed with steam, in the presence of a catalyst, to convert the fuel/steam mixture to hydrogen, carbon monoxide, carbon dioxide, water, and impurities. Since most known reformers are sensitive to the presence of impurities, impurities such as sulfur are generally removed from the fuel before entering the reformer. Most reformers leave small amounts of carbon monoxide (CO), typically about one mole percent, in the reformat or reformer product gas. Additional mechanisms are required to almost completely eliminate CO and other potentially harmful impurities from the reformer product gas. Such additional mechanisms add to the manufacturing and processing costs of electricity generating systems using fuel cells.

OBJECTS AND SUMMARY OF THE INVENTION

Accordingly, an object of the present invention is to overcome the limitations and drawbacks of the prior art.

Another object of the present invention is to provide a system that reforms a hydrocarbon fuel for use in a fuel cell.

A further object of the present invention is to use an electrochemical autothermal reformer to produce pure hydrogen from a hydrocarbon fuel for use in a fuel cell to generate electricity.

Briefly stated, a fuel cell power plant includes an electrochemical autothermal reformer (EATR) which provides hydrogen to the anode side of a fuel cell. The EATR includes an autothermal reformer region, a mixed ion conductor layer, and an anode supply region. The mixed ion conductor layer separates the autothermal reformer region from the anode supply region. An anode gas loop between an anode supply region of the EATR and an anode compartment or section of the fuel cell circulates a mixture of hydrogen and a carrier gas. The presence of the carrier gas ensures that the partial pressure of hydrogen in the anode loop remains low relative to the hydrogen partial pressure in the ATR region of the EATR in order to effect the hydrogen separation or transfer of hydrogen from the ATR region to the anode supply region. A difference in operating temperature between the EATR and the fuel cell is exploited by heat exchangers which efficiently enable certain heating and cooling functions within the power plant.

According to an embodiment of the invention, a fuel cell power plant comprises a fuel cell and an electrochemical autothermal reformer, the fuel cell consisting of fuel cell anode and fuel cell cathode compartments or sections, and the electrochemical autothermal reformer consisting of an autothermal reformer region, a mixed ion conductor layer, and an anode supply region. The mixed ion conductor layer separates the autothermal reformer region from the anode supply region, and an anode gas loop is used for circulating a mixture of hydrogen and a carrier gas between the anode supply region of the reformer and the fuel cell anode compartment or section.

Other features of the fuel cell power plant include burning means for burning excess hydrogen from the autothermal reformer exhaust region, fuel feeding means for feeding a hydrocarbon fuel to the autothermal reformer region, and control means, responsive to the burning means, for controlling the fuel feeding means.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
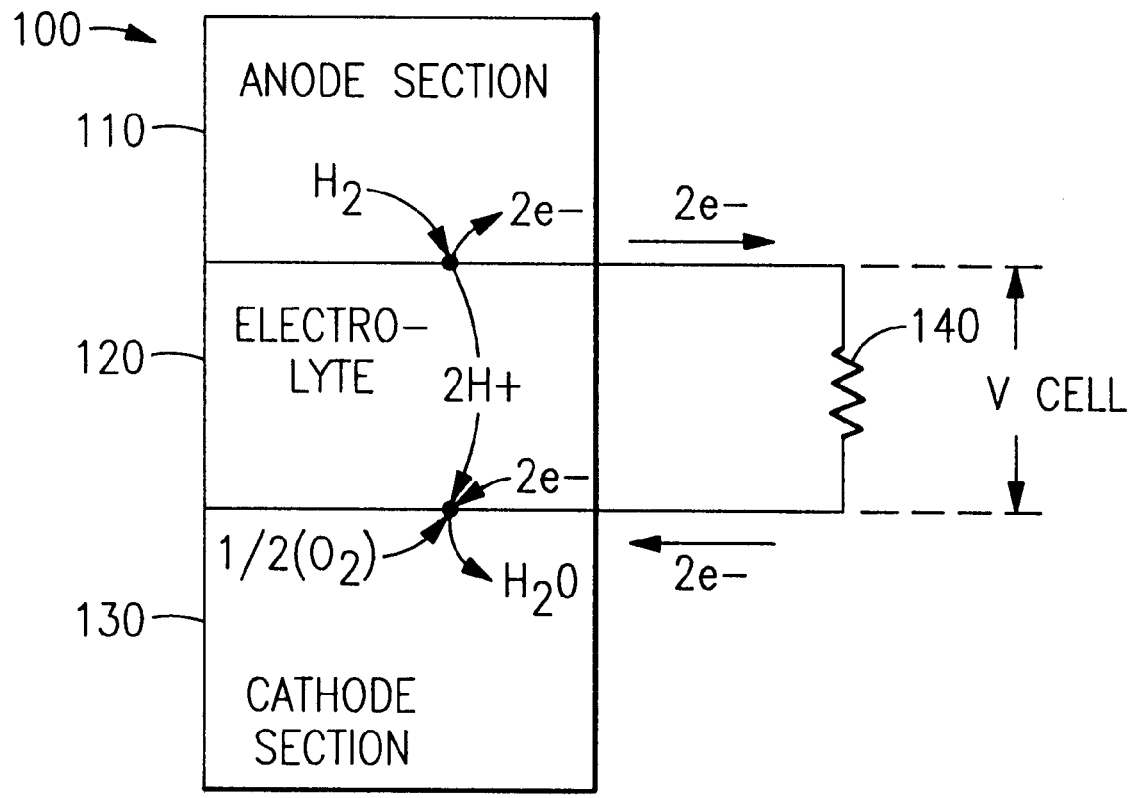
FIG. 1 is an example of a typical Proton Exchange Membrane (PEM) fuel cell.

Referring to FIG. 1, a fuel cell 100 includes an anode section 110 and a cathode section 130 separated by an electrolyte 120. $H_2$ dissociates at the anode section 110 providing two protons, and freeing two electrons in the process which pass through an external load 140 before reaching the cathode section 130. In the case of a proton exchange membrane (PEM) fuel cell, the protons diffuse through an electrolyte 120, which is a membrane, before reaching the cathode section 130 and combining there with $O_2$ and the electrons returning from the external load 140 to form water. Other types of fuel cells that can be used in the invention include phosphoric acid fuel cells, alkaline fuel cells, solid oxide fuel cells, and molten carbonate fuel cells. Water, $H_2O$, is produced at the cathode section 130. The $O_2$ is preferably provided by air flowing through the cathode section 130.

Figure 2:
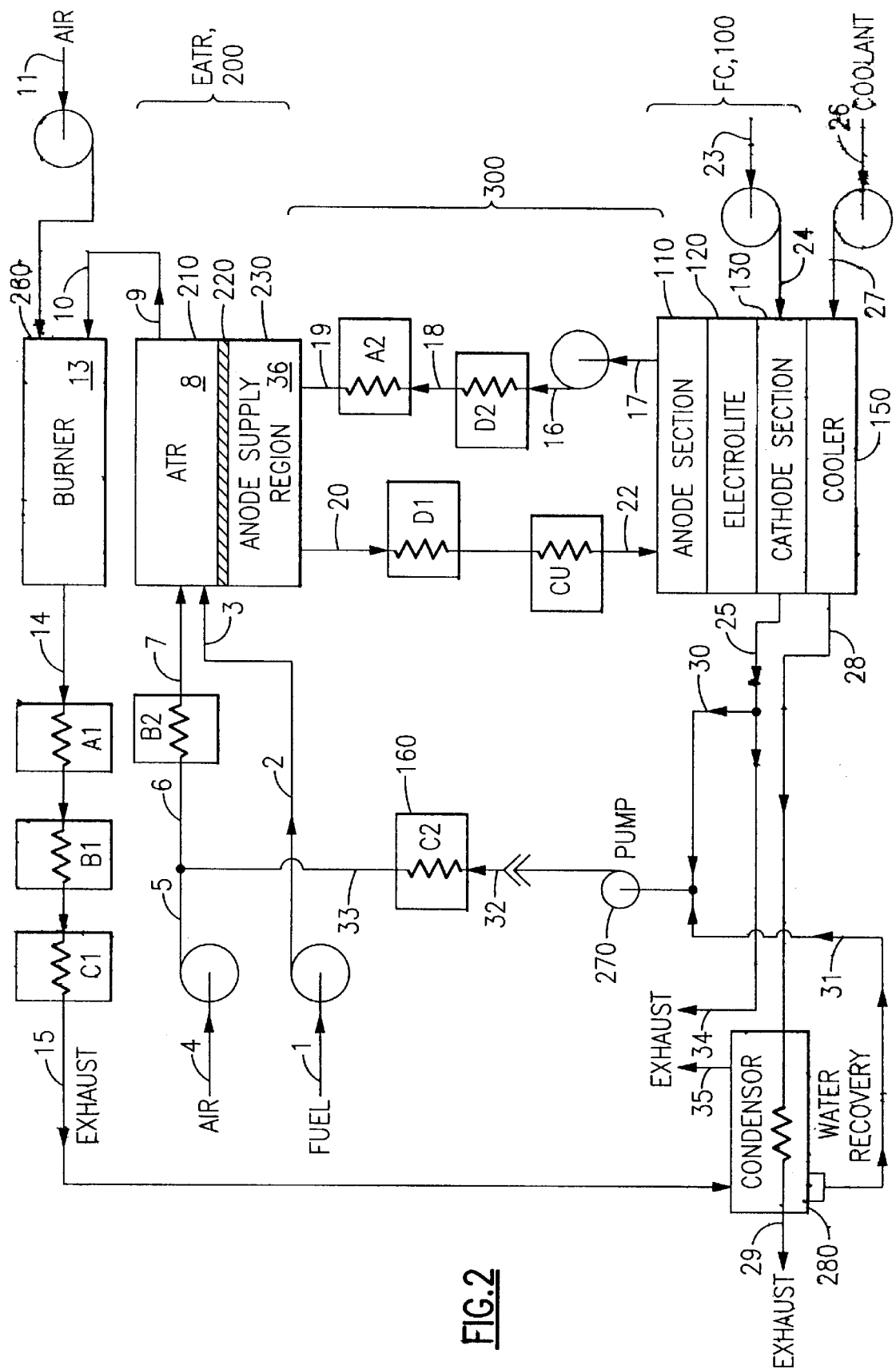
FIG. 2 is a schematic diagram of a fuel cell power plant according to the present invention.

Referring to FIG. 2, an EATR (electrochemical autothermal reformer) 200 includes an ATR (autothermal reformer) 210 joined to an anode supply region 230 by a membrane layer 220. The membrane layer 220 is a mixed ion conductor. An electrochemical autothermal reformer combines the principles of electrochemical hydrogen separation and autothermal reforming in tandem. The purpose of the electrochemical autothermal reformer is to effect the selective removal of hydrogen from the autothermal reforming region of the EATR so as to drive the reforming reaction to completion while separating the hydrogen gas for use on the anode side of a fuel cell.

The functioning of EATR 200 along with the composition of the membrane layer 220 is the subject of a copending application filed concurrently herewith entitled "ELECTROCHEMICAL AUTOTHERMAL REFORMER" (attorney docket no. 269-005) and incorporated herein by reference. The hydrogen produced by EATR 200 is used to feed the fuel cell 100, as explained in greater detail below.

Referring to the diagram of FIG. 2, the EATR 200 is fed with a hydrocarbon fuel stream from node 1 and an air stream from node 4. The air is mixed with steam from a boiler 160 at node 33 to form an air/steam mixture. The air/steam mixture is heated in a heat exchanger B2 between nodes 6 and 7 prior to entering ATR 210. ATR 210 operates at temperatures from about 800° F. to about 2500° F., while the fuel cell anode section 110 operates from about 70° F. to about 200° F., depending on pressure.

A low hydrogen partial pressure in the anode supply region 230 of EATR 200 is preferable in contrast with a higher partial pressure of hydrogen in the ATR 210 side of the EATR 200. Because of the difference in partial pressure of hydrogen in this situation, hydrogen is transferred via the membrane layer 220 from ATR 210 to the anode supply region 230. The portion of hydrogen which does not cross the membrane layer 220, leaves the ATR 210 at node 9, along with unreacted fuel and carbon monoxide, before entering a burner 260 at node 10 where it is combusted, after being mixed with air entering the burner 260 at node 12. Combustion exhaust passes through a plurality of heat exchangers A1/A2, B1/B2, and C1/C2 before reaching a condenser 280 in which water is removed. The recovered water from the condenser 280 is pumped through node 31 by a pump 270 to feed a boiler 160 at node 32. Heat is transferred from A1, B1, and C1 to other parts of the system. Heat from B1 is preferably used to heat the air/steam mixture (B2) described above between nodes 6 and 7. Heat from C1 is preferably used in boiler 160 (C2). The use of the heat from A1 is described below.

An anode gas loop 300 circulates between the anode compartment or section 110 of the fuel cell 100 and the anode supply region 230 of EATR 200. A gas mixture of hydrogen and a carrier gas leaves the anode section 110 at node 17 with a low hydrogen partial pressure, since hydrogen is consumed within the anode section 110 when producing electricity. The carrier gas is preferably any inert gas which does not poison the fuel cell anode section 110 or pass through the fuel cell electrolyte layer 120, or any vapor which does not poison the fuel cell 100. Such gas or vapor carriers typically include steam or inert gasses, such as argon or nitrogen. A heat exchanger D1/D2 transfers heat from a cold side of anode gas loop 300 (D1) to a hot side of anode gas loop 300 (D2). A heat exchanger CU transfers heat from the cold side of anode gas loop 300 to act as a heat source for use outside the system. Heat exchanger A1/A2 transfers heat from burner 260 (A1) to the hot side of anode gas loop 300 (A2).

The gas mixture enters heat exchanger D1/D2 at node 16 where it is heated. The gas mixture then enters heat exchanger A1/A2 at node 18 where it is further heated before entering the anode supply region 230 of EATR 200 at node 19. The gas mixture is thus preferably heated to near the operating temperature of EATR 200. The presence of the carrier gas allows the hydrogen partial pressure at node 19, and therefore in anode supply region 230, to be low with respect to the hydrogen partial pressure in ATR 210, which is necessary for hydrogen to cross the membrane layer 220 from ATR 210 into anode supply region 230 by virtue of a hydrogen partial pressure or concentration gradient.

The hydrogen produced by EATR 200 joins with the gas mixture in node 19 from the fuel cell 100 before entering heat exchanger D1/D2 at node 20 where heat is removed from the mixture. Additional heat is removed from the gas mixture by heat exchanger CU such that the mixture entering the fuel cell anode section 110 at node 22 is cooled near the operating temperature of the fuel cell 100. The hydrogen produced by EATR 200 is thus transported via anode gas loop 300 to fuel cell 100 where it is converted into electricity.

Air from node 23 is fed into the fuel cell cathode section 130 at node 24. The air in cathode section 130 provides the oxygen required for the functioning of fuel cell 100. The cathode air is exhausted from the cathode section 130 at node 25, thus removing water vapor which is produced from the cathode section 130 by the action of the fuel cell 100. The air passing through cathode section 130 also provides some cooling effect for fuel cell 100. Water from cathode section 130 is optionally sent to the boiler 160 via node 30 and pump 270 to augment the water provided to boiler 160 from condenser 280. Pump 270 is preferably a circulation pump unless ATR 210 is being run at high pressure as described above. A condenser (not shown) is optionally used at node 25 as necessary.

A coolant, which may be air or liquid, enters a cooler 150 via node 27 to further cool fuel cell 100. The coolant leaves cooler 150 via node 28, and is directed to condenser 280, where, it is used to provide cooling capacity for condenser 280 since the coolant is cool, relative to burner 260 exhaust gases. If the coolant is air, it is exhausted via node 29. If the coolant is liquid, a closed loop (not shown) is installed so that the coolant is reused in a manner conventionally known.

The presence of the carrier gas allows anode gas loop 300 to operate at a low hydrogen partial pressure but at a high total pressure. The fuel cell anode section 110 is not overly sensitive to the hydrogen partial pressure provided that contaminants, such as carbon monoxide, are not present. Using water vapor or steam as the carrier is preferable since the presence of water in anode gas loop 300 is advantageous if the water is made to condense on the cold side of anode gas loop 300 (D1 and CU) and evaporate on the hot side of anode gas loop 300 (D2 and A2). In this way, the partial pressure of hydrogen in EATR anode supply region 230 can be much lower than the hydrogen partial pressure in fuel cell anode section 110.

EATR 200 functions properly as long as a sufficient hydrogen partial pressure gradient exists between ATR 210 and anode supply region 230. As described above, this hydrogen partial pressure gradient is maintained by the action of anode gas loop 300. In an alternate arrangement, ATR 210 is run at high pressure. High pressure considerations include using a positive displacement pump in place of the pump 270, compressing the air stream between nodes 4 and 5, and optionally adding a pressure step-down between nodes 9 and 10. In a suitably large system, a gas turbine between nodes 9 and 10 would provide the required pressure step-down function, with the mechanical energy produced by the turbine used to power an air compressor (not shown) between nodes 4 and 5.

As described above, having a higher hydrogen partial pressure in ATR 210 relative to anode supply region 230 permits hydrogen to cross the membrane layer 220 from ATR 210 to anode supply region 230. When the hydrogen partial pressure is higher in anode supply region 230 than in ATR 210, hydrogen crosses the membrane layer 220 in reverse from anode supply region 230 to ATR 210. Monitoring a temperature of the exhaust from burner 260 at node 14 exploits this fact. If there is low power demand on fuel cell 100, hydrogen is not consumed by the anode section 110 and the hydrogen partial pressure in anode gas loop 300 increases. The instantaneous increase in partial pressure of the hydrogen in the anode supply region 230 causes hydrogen to move through EATR 200 in reverse, moving from anode supply region 230 to ATR 210 until the hydrogen partial pressures are equal on both sides of membrane layer 220. Since hydrogen partial pressure gradient no longer exists across the membrane layer 220, hydrogen transport across membrane layer 220 ceases. Therefore, all reformed hydrogen leaves ATR 210 via node 9 and enters burner 260, thus causing a temperature increase at node 14. This temperature increase signals a need to decrease the fuel supply at node 1. Conversely, increased power demand on fuel cell 100 results in more hydrogen being consumed in the fuel cell 100 and less hydrogen being delivered to burner 260, causing the burner temperature to drop, thereby signaling the need to increase the fuel supply. Further description is omitted because setting up a monitor and feedback loop to increase or decrease the fuel supply is considered to be within the ability of one skilled in the art.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A fuel cell power plant, comprising:

a fuel cell;

an electrochemical autothermal reformer;

said fuel cell including a fuel cell anode section and a fuel cell cathode section;

said electrochemical autothermal reformer including an autothermal reforming region, a mixed ion conductor or membrane layer, and an anode supply region said mixed ion conductor layer separating said autothermal reformer region from said anode supply region; and an anode gas loop which provides a circulating means for circulating a first mixture between said fuel cell anode section and said reformer anode supply region, said first mixture including hydrogen and a carrier gas.

2. A fuel cell power plant according to claim 1, wherein said fuel cell is one of a proton exchange membrane or solid polymer electrolyte fuel cell, a phosphoric acid fuel cell, an alkaline fuel cell, a solid oxide fuel cell, and a molten carbonate fuel cell.

3. A fuel cell power plant according to claim 1, further comprising:

burning means for exhausting and burning excess hydrogen from said autothermal reformer region; and fuel feeding means, responsive to said burning means, for feeding a hydrocarbon fuel to said autothermal reformer region.

4. A fuel cell power plant according to claim 3, further comprising:

air feeding means for feeding a second mixture to said autothermal reformer region, said second mixture being of air and steam;

steam producing means, connected to said air feeding means, for producing said steam; and a first heat exchanger between an output of said burning means and said steam producing means.

5. A fuel cell power plant according to claim 4, further comprising:

temperature increasing means for increasing the temperature of said first mixture as said first mixture circulates in a first path from said fuel cell anode section to said reformer anode supply region; and temperature decreasing means for decreasing the temperature of said first mixture as said first mixture circulates in a second path from said reformer anode supply region to said fuel cell anode section.

6. A fuel cell power plant according to claim 5, wherein said increasing temperature means and said decreasing temperature means together form a second heat exchanger.

7. A fuel cell power plant according to claim 6, further comprising a third heat exchanger between an output of said burning means and said first mixture in said first path.

8. A fuel cell power plant according to claim 7, further comprising a fourth heat exchanger between said output of said burning means and said first mixture of air and steam in said air feeding means.

9. A fuel cell power plant according to claim 8, further comprising a fifth heat exchanger between said first mixture in said second path and a point outside said power plant.

10. A fuel cell power plant, comprising:

a fuel cell;

an electrochemical autothermal reformer;

said fuel cell including a fuel cell anode section and a fuel cell cathode section;

said electrochemical autothermal reformer including an autothermal reforming region, a mixed ion conductor or membrane layer, and an anode supply region; said mixed ion conductor layer separating said autothermal reformer region from said anode supply region;

circulating means for circulating a mixture of hydrogen and a carrier gas between said fuel cell anode section and said reformer anode supply region;

burning means for exhausting and burning excess hydrogen from said autothermal reformer region;

fuel feeding means for feeding hydrogen fuel to said autothermal reformer region; and control means, responsive to said burning means, for controlling said fuel feeding means.

* * * * *